US008066618B2

(12) United States Patent
Noda et al.

(10) Patent No.: US 8,066,618 B2
(45) Date of Patent: Nov. 29, 2011

(54) HYDRAULIC CONTROL DEVICE FOR STARTING DEVICE

(75) Inventors: Kazuyuki Noda, Handa (JP); Yuichiro Umemoto, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 484 days.

(21) Appl. No.: 12/382,457

(22) Filed: Mar. 17, 2009

(65) Prior Publication Data

US 2009/0241531 A1 Oct. 1, 2009

(30) Foreign Application Priority Data

Mar. 31, 2008 (JP) .................................. 2008-093356

(51) Int. Cl.
*F16H 61/00* (2006.01)
*F16D 35/00* (2006.01)
*F16D 19/00* (2006.01)
(52) U.S. Cl. ........................ 477/168; 192/3.3; 192/85.63
(58) Field of Classification Search .................... 477/168
See application file for complete search history.

(56) References Cited

U.S. PATENT DOCUMENTS

| 6,474,456 | B2 * | 11/2002 | Suzuki et al. | 192/3.29 |
| 6,662,918 | B2 * | 12/2003 | Takeuchi et al. | 192/3.29 |
| 7,611,002 | B2 * | 11/2009 | Gierer et al. | 192/3.3 |
| 2006/0032720 | A1 * | 2/2006 | Ando et al. | 192/3.3 |

FOREIGN PATENT DOCUMENTS

| JP | A-2-261964 | 10/1990 |
| JP | A-8-338523 | 12/1996 |
| JP | A-2001-173764 | 6/2001 |

* cited by examiner

*Primary Examiner* — Dirk Wright
(74) *Attorney, Agent, or Firm* — Oliff & Berridge, PLC

(57) ABSTRACT

A hydraulic control device includes a first oil path; a second oil path; a third oil path; an engagement pressure generation unit; a signal pressure generation unit; and an internal pressure switching unit that switches between a non-reduced pressure state where locking occurs due to the signal pressure inputted and a source pressure is outputted unchanged as internal pressure to the first oil path, and a reduced pressure state where the signal pressure is not inputted and a hydraulic pressure is regulated to a constant pressure from the source pressure, based on a feedback pressure of the internal pressure and an urging force of a first urging unit, and outputted as the internal pressure to the first oil path.

4 Claims, 1 Drawing Sheet

HYDRAULIC CONTROL DEVICE FOR STARTING DEVICE

INCORPORATION BY REFERENCE

The disclosure of Japanese Patent Application No. 2008-093356 filed on Mar. 31, 2008 including the specification, drawings and abstract is incorporated herein by reference in its entirety.

BACKGROUND OF THE INVENTION

The present invention relates to a hydraulic control device for a starting device.

An automatic transmission mounted in a vehicle such as an automobile typically includes a torque converter as a starting device. The torque converter uses hydraulic transmission between an engine and an automatic speed change mechanism, for example, when starting, to absorb rotational differences between a driving wheel in a stationary state and an engine in a rotating state, and to transmit a driving force. Recently, such a torque converter includes a lock-up clutch that locks up an output shaft of the engine and an input shaft of the automatic speed change mechanism so as to reduce a transmission loss that accompanies a hydraulic transmission.

In such a lock-up clutch, which is conventionally proposed as a multi-plate type, the inside of a torque converter case is structured so as to be separated into a hydraulic oil chamber for the lock-up clutch and a transmission oil chamber in which a hydraulic transmission portion is arranged (see Japanese Patent Application Publication No. JP-A-2001-173764).

The lock-up clutch is structured so that, when hydraulic pressure is supplied to the hydraulic oil chamber and the hydraulic pressure in the hydraulic oil chamber rises above the hydraulic pressure in the transmission oil chamber, a piston is pressed to drive and a friction plate is engaged; thus setting the lock-up clutch to lock-up on. In addition, when the hydraulic pressure is supplied to the transmission oil chamber and the hydraulic pressure in the transmission oil chamber rises above the hydraulic pressure in the hydraulic oil chamber, the piston is pressed in a reverse direction; thus setting the lock-up clutch to lock-up off.

SUMMARY OF THE INVENTION

During lock-up off, a torque converter including a multi-plate lock-up clutch according to Japanese Patent Application Publication No. JP-A-2001-173764 supplies hydraulic pressure of a predetermined pressure to the transmission oil chamber to maintain an internal pressure therewithin. During lock-up on, the torque converter supplies a reduced hydraulic pressure that is less than the predetermined pressure into the transmission oil chamber as an internal pressure to improve responsiveness for when a lock-up clutch engages. Specifically, in a hydraulic control device of the torque converter, when in a state of lock-up on, a predetermined hydraulic pressure is reduced by being passed through a circuit arranged with orifices and relief valves. The hydraulic pressure that is reduced to a lower pressure than the predetermined pressure is supplied as an internal pressure to the transmission oil chamber.

However, as a result of a reduction of pressure due to passing through the circuit arranged with the orifices and the relief valves, it is not possible to stabilize the internal pressure supplied to the transmission oil chamber and there is a concern that this may interfere with a smooth engagement of the lock-up clutch.

It is therefore an object of the present invention to provide a hydraulic control device for a starting device that is capable of switching an internal pressure to a reduced pressure state that is reduced to a constant pressure, and then outputting the reduced internal pressure. The present invention can also achieve various other advantages.

A hydraulic control device for a starting device according to an exemplary aspect of the invention includes a first oil path that inputs an internal pressure to the starting device that includes a clutch; a second oil path that discharges the internal pressure; a third oil path that inputs an engagement pressure of the clutch; an engagement pressure generation unit that outputs the engagement pressure of the clutch to the third oil path; a signal pressure generation unit that outputs a signal pressure when the engagement pressure is not inputted, and outputs no signal pressure when the engagement pressure is inputted; and an internal pressure switching unit that switches between a non-reduced pressure state where locking occurs due to the signal pressure inputted and a source pressure is outputted unchanged as internal pressure to the first oil path, and a reduced pressure state where the signal pressure is not inputted and a hydraulic pressure is regulated to a constant pressure from the source pressure, based on a feedback pressure of the internal pressure and an urging force of a first urging unit, and outputted as the internal pressure to the first oil path.

BRIEF DESCRIPTION OF THE DRAWINGS

Various exemplary aspects of the invention will be described with reference to the drawing, wherein.

DETAILED DESCRIPTION OF THE EMBODIMENTS

Figure 1:
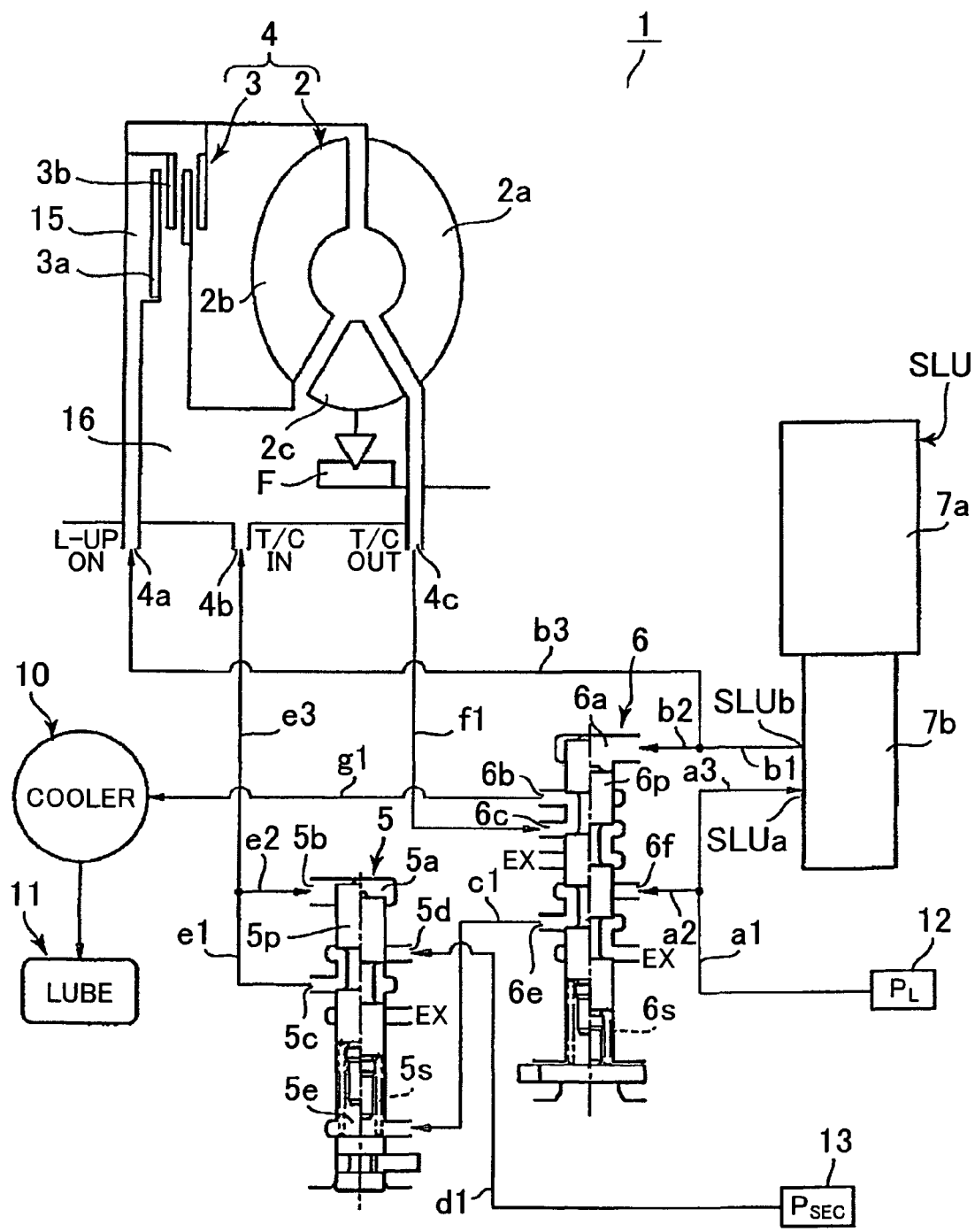
FIG. 1 is a schematic diagram that shows a starting device and a hydraulic control device according to the present embodiment.

Hereinafter, embodiments of the present invention will be described with reference to a FIGURE. FIG. 1 is a schematic diagram that shows a hydraulic control device 1 according to the present embodiment.

An automatic transmission (full diagram is omitted), for example, mounted in a vehicle or the like is structured including: an input shaft capable of connection to a crankshaft of an engine; a torque converter (starting device) 4 capable of carrying out a hydraulic transmission for a rotation (driving force) of the input shaft; and a speed change mechanism that, using a gear mechanism and friction engagement elements (clutches and brakes), shifts the rotation inputted via the torque converter 4 and transmits the rotation to an output shaft. The automatic transmission includes the hydraulic control device 1 for a starting device according to the present invention to hydraulically control the torque converter 4 and an engagement state of the friction engagement elements in the speed change mechanism.

As shown in FIG. 1, the torque converter 4 is structured including: a hydraulic transmission portion 2 consisting of a pump impeller 2a that inputs rotation from the input shaft, a turbine runner 2b that receives an oil flow from the pump impeller 2a and is therefore rotated (hydraulically transmitted) and a stator 2c that rectifies oil returned from the turbine runner 2b to the pump impeller 2a, and also causes a torque increase effect; and a lock-up clutch (clutch) 3 that creates a direct contact state between an input shaft and the turbine runner 2b based on a hydraulic pressure supply described later. Note that the stator 2c is structured so that, when the rotation of the turbine runner 2b falls below the rotation of the pump impeller 2a due to a one-way clutch F and thereby the rotation of the stator 2c becomes fixed, the torque increase effect is brought about to receive a pressure of an oil flow reaction force. Conversely, when the rotation of the turbine runner 2b rises above the rotation of the pump impeller 2a and thereby the rotation of the stator 2c becomes idle, the oil flow is prevented from going in a negative direction.

In addition, the torque converter 4 according to the present embodiment includes a multi-plate type lock-up clutch 3, which, compared to a single-plate type consisting of, for example, a clutch plate and a piston integrally structured and thus operating due to different pressures acting on the clutch plate, consists of a clutch piston 3a separately structured and a cylinder as an internal surface of a case of the torque converter 4 (not shown). Accordingly, the torque converter 4 is structured including a hydraulic oil chamber 15 positioned between the case and the clutch piston 3a and a transmission oil chamber 16 positioned on a side accommodating a friction plate 3b and the hydraulic transmission portion 2.

Furthermore, the operation oil chamber 15 includes: an input port (third oil path) 4a to which the engagement pressure $P_{SLU}$ described later is inputted from the hydraulic control device 1. The transmission oil chamber 16 includes an input port (first oil path) 4b to which the circulatory pressure (internal pressure) which operates the hydraulic transmission portion 2 is inputted from the hydraulic control device 1; and an output port (second oil path) 4c that discharges the circulatory pressure. Note that to correspond to FIG. 1 schematically shown, the input port 4a, the input port 4b and the output port 4c are shown in a way to denote ports. However, in reality, the input port 4a is an oil path inside the input shaft (not shown), the input port 4b is an oil path formed by a gap between an outer-peripheral side of the input shaft and an inner-peripheral side of a stator shaft (not shown), and the output port 4c is an oil path formed by a gap between the outer-peripheral side of the stator shaft and an inner-peripheral side of the case of the torque converter 4.

The following is a description of the hydraulic control device 1 according to the present invention. As shown in FIG. 1, the hydraulic control device 1 is structured including a linear solenoid valve (a lock-up engagement pressure generation unit) SLU, a torque converter circular modulator valve (an internal pressure switching unit and modulator valve) 5, a lock-up relay valve (a signal pressure generation unit and switch valve) 6, an oil cooler 10, and the like.

Note that other than the portions shown in FIG. 1, the hydraulic control device 1 includes various valves, oil paths, or the like, for supplying hydraulic pressure to a hydraulic servo of clutches or brakes of the speed change mechanism. However, to simplify description, portions other than the necessary portions of the present invention are omitted in the descriptions.

In terms of a portion omitted from the FIGURE, the hydraulic control device 1 includes an oil pump communicating therewith and driven by the engine rotation. The oil pump is used to suck up an oil from an oil pan via a strainer and thereby generates the hydraulic pressure. The hydraulic pressure generated by the oil pump is outputted by an output port to each oil path, and at the same time, the line (the source of the signal pressure) pressure $P_L$ is generated by a primary regulator valve (a line pressure generation unit) 12 and supplied to an oil path a1. Furthermore, the primary regulator valve 12 regulates a discharge of the hydraulic pressure generated by the oil pump and also generates line pressure $P_L$. Moreover, a secondary regulator valve (a secondary pressure generation unit) 13 further regulates the discharged hydraulic pressure and generates a secondary pressure (source pressure) $P_{SEC}$ that is then supplied to the oil path d1.

The linear solenoid valve SLU includes a linear drive portion 7a and a pressure regulating valve portion 7b. The linear drive portion 7a includes a plunger, a position of which is electronically controlled (linearly driven) according to a vehicle driving condition. The pressure regulating valve 7b includes a spool, a spring that urges the spool toward the plunger (upper side in the FIGURE), an input port SLUa into which the line pressure $P_L$ is inputted, and an output port SLUb.

The torque converter circular modulator valve 5 includes a spool (first spool) 5p and a spring (a first urging unit) 5s that urges the spool 5p upward, and also includes an oil chamber (first oil chamber) 5a upward from the spool 5p, an oil chamber (second oil chamber) 5e downward from the spool 5p, a port 5c, a port 5d, and a drain port EX.

When the torque converter circular modulator valve 5 includes the spool 5p in a left half position, the port 5c communicates with the port 5d. When the torque converter circular modulator valve 5 includes the spool 5p in a downward position in the FIGURE, the port 5c communicates with the drain port EX. Note that a right half position of the torque converter circular modulator valve 5 in FIG. 1 shows a possible aspect of a regulated pressure state described later, and shows a state having the port 5c not communicating with either the port 5d or the drain port EX.

The oil chamber 5a is connected to the port 5c via oil paths e2, e1, and is also connected to the input port 4b of the torque converter 4 via oil paths e2, e3. The secondary pressure $P_{SEC}$ is inputted into the port 5d that communicates with the port 5c when the spool 5p is in an upward position via an oil path d1. The oil chamber 5e is connected to a port 6e of the lock-up relay valve 6 via an oil path c1.

The lock-up relay valve 6 includes a spool (second spool) 6p and a spring (a second urging unit) 6s that urges the spool 6p upward, and also includes an oil chamber (third oil chamber) 6a upward from the spool 6p, a port 6b, a port 6c, a port 6e, a port 6f, and a drain port EX.

When the lock-up relay valve 6 includes the spool 6p in a left half position, the port 6b communicates with the port 6c, and the port 6e communicates with the port 6f. When the lock-up relay valve 6 includes the spool 6p in a right half position, the port 6c communicates with the drain port EX, the port 6e communicates with the drain port EX, and the port 6b and the port 6f become shut-off.

The oil chamber 6a is connected to the output port SLUb of the linear solenoid valve SLU via oil paths b2, b1. The port 6b is connected to the oil cooler 10, which is connected to a lubrication oil path 11 that supplies a lubricating oil to each portion inside the automatic transmission via an oil path g1. The port 6c, which communicates with the port 6b when the spool 6p is in a left half position, is connected to the output port 4c of the torque converter 4 via an oil path f1. The port 6e is connected to the oil chamber 5e of the torque converter circular modulator valve 5 via the oil path c1. The line pressure $P_L$ is inputted to the port 6f, which communicates with the port 6e when the spool 6p is in a left half position, via oil paths a2, a1.

The following will describe an operation of the hydraulic control device 1 according to the present embodiment.

When an electronic control device that is not shown in a FIGURE judges the lock-up clutch 3 to be in an off state based on, for example, a vehicle driving condition, the linear solenoid valve SLU is set to an off state by an electronic control of the electronic control device. When the linear solenoid SLU is in an off state, the hydraulic pressure is not inputted into the oil chamber 6a of the lock-up relay valve 6, and based on the urging force of the spring 6s the spool 6p is moved upward to the left half position. Also, the line pressure $P_L$ inputted to the port 6f via the oil paths a1, a2 is outputted as the signal pressure $P_{SA}$ from the port 6e and supplied to the oil chamber 5e of the torque converter circular modulator valve 5 via the oil path c1. The secondary pressure $P_{SEC}$ inputted into the port 5d of the torque converter circular modulator valve 5 via the oil path d1 is then outputted as the circular pressure $P_B$ from the port 5c. The circular pressure $P_B$ is then inputted into the input port 4b of the torque converter 4 via the oil paths e1, e3 and supplied to the transmission oil chamber 16 (non-reduced pressure state). Specifically, the piston 3a of the lock-up clutch 3 is pressed to the left side in the FIGURE, the friction plate 3b is released and the lock-up clutch 3 is set to a released state.

Furthermore, the circular pressure $P_B$ supplied to the transmission oil chamber 16 is discharged from the output port 4c and inputted into the port 6c of the lock-up relay valve 6 via the oil path f1. The circular pressure $P_B$ inputted into the port 6c is outputted from the port 6b and inputted into the oil cooler 10 via the oil path g1. Note that the oil inputted into the oil cooler 10 is cooled within the oil cooler 10 and then supplied to the lubrication oil path 11.

Furthermore, the circular pressure $P_B$ outputted from the port 5c of the torque converter circular modulator valve 5 is inputted into the oil chamber 5a via the oil paths e1, e2 and consequently presses the spool 5p downward against the urging force of the spring 5s. However, as a result of a hydraulic action by the signal pressure $P_{SA}$ (line pressure PL) inputted into the spring 5s and the oil chamber 5e, the spool 5p is urged upward with a stronger force and thereby a left half position thereof can be reliably maintained.

Meanwhile, when the electronic control device judges the lock-up clutch 3 to be in an on state based on, for example, a vehicle driving condition, the electronic control device starts a lock-up control of the lock-up clutch 3. First, a current is gradually supplied to the linear solenoid valve SLU and the engagement pressure $P_{SLU}$ is outputted from the output port SLUb. The engagement pressure $P_{SLU}$ outputted from the output port SLUb is inputted into the oil chamber 6a of the lock-up relay valve 6 via the oil paths b1, b2, and inputted into the input port 4a of the torque converter 4 via the oil paths b1, b3, and then supplied to the hydraulic oil chamber 15.

When the engagement pressure $P_{SLU}$ from the linear solenoid valve SLU that is inputted into the oil chamber 6a of the lock-up relay valve gradually increases, the spool 6p is pressed downward against the urging force of the spring 6s to be in a right half position. Consequently, the port 6b and the port 6c become shut-off, the port 6c communicates with the drain port EX and the circular pressure $P_B$ that is discharged from the output port 4c is drained. Also, the port 6e and the port 6f become shut-off while the port 6e communicates with the drain port EX. Consequently, the signal pressure $P_{SA}$ that is outputted from the port 6e becomes shut-off and the hydraulic pressure acting in the oil chamber 5e of the torque converter circular modulator valve 5 is drained via the oil path c1 and the port 6e.

At this point, the spool 5p of the torque converter circular modulator valve 5 is urged downward due to the circular pressure $P_B$ inputted into the oil chamber 5a as described above, and starts to move downward against the urging force of the spring 5s. When the spool 5p starts to move downward, the port 5c and the port 5d gradually become shut-off, the circular pressure $P_B$ outputted from the port 5c gradually becomes weaker, and the urging force of the circular pressure $P_B$ in the oil chamber 5a also weakens. Then, if the urging force of the spring 5s rises above the urging force of the circular pressure $P_B$ in the oil chamber 5a, the spool 5p again moves upward, resulting in the port 5c communicating with the port 5d. As a result of repeating this movement, the torque converter circular modulator valve 5 outputs the circular pressure $P_B$ regulated to a lower constant pressure than the secondary pressure $P_{SEC}$. The circular pressure $P_B$ is then supplied to the transmission oil chamber 16 via the oil path e3 and the input port 4b (reduced pressure state). Note that the circular pressure $P_B$ reduced to less than the secondary pressure $P_{SEC}$ can be regulated by changing the urging force of the spring 5s.

After which, the transmission oil chamber 16 is in a state where the circular pressure $P_B$ is regulated to a constant pressure lower than the secondary pressure $P_{SEC}$. In this state, when a slip control is carried out and the lock-up clutch 3 is engaged, the engagement pressure $P_{SLU}$ from the linear solenoid valve SLU is maximized and the lock-up clutch 3 is fully set to lock-up on. As the lock-up clutch 3 switches from lock-up on to lock-up off, the engagement pressure $P_{SLU}$ from the linear solenoid valve SLU gradually decreases. After the slip controls have been carried out, the engagement pressure $P_{SLU}$ from the linear solenoid valve SLU becomes zero and the lock-up clutch 3 is set to lock-up off.

As described above, the hydraulic control device 1 for the starting device according to the present invention includes the torque converter circular modulator valve 5. The torque converter circular modulator valve 5 switches between: a non-reduced pressure state where the secondary pressure $P_{SEC}$ is outputted unchanged to the input port 4a as the circular pressure $P_B$; and a reduced pressure state where the hydraulic pressure is regulated to a constant pressure from the secondary pressure $P_{SEC}$, based on a feedback of the circular pressure $P_B$ and the urging force of the spring 5s, and outputted to the input port 4a as the circular pressure $P_B$. Hence, compared to when pressure is reduced using, for example, a relief valve, it is possible to carry out a more stable reduction in pressure. Thereby, a circular pressure $P_B$ of the torque converter 4 in a stable reduced pressure state can be achieved and controllability when engaging the lock-up clutch 3 can be improved. Also, compared to when a pressure is reduced by draining an oil using a relief valve, waste flow from oil leakage can be reduced and a volume of an oil pump can be reduced. Accordingly, since the volume of the oil pump can be reduced, it is therefore possible to reduce a torque necessary for driving the oil pump. As a result a torque loss of an automatic transmission can be reduced and vehicle fuel efficiency can be improved.

In addition, since the source pressure of the signal pressure $P_{SA}$ of the lock-up relay valve 6 is the line pressure $P_L$ and the source pressure of the torque converter circular modulator valve 5 is the secondary pressure $P_{SEC}$, the larger line pressure $P_L$ than the secondary pressure $P_{SEC}$ that is the source pressure of the torque converter circular modulator valve 5 can cause locking. Therefore it is possible to reliably perform a switch operation of the torque converter circular modulator valve 5.

The torque converter circular modulator valve 5 is a modulator valve including the spool 5p, the spring 5s, the oil chamber 5a and the oil chamber 5e, while the lock-up relay valve 6 is a switch valve including the spool 6p, the spring 6s and the oil chamber 6a. Compared to a structure that includes, for example, a single long valve and a relief valve, switches channels to enable a passage of a circuit with a relief valve, and reduces the secondary pressure $P_{SEC}$ before outputting it, two short valves enable a structure capable of switching to a reduced pressure state. It is also possible for a valve body as a whole to become more compact.

The present embodiment described above explains a torque converter with a lock-up clutch as a starting device. However, not to be limited to this, the present invention can be applied to a starting device including a fluid coupling, a damper device capable of absorbing torque vibrations generated by the engine and a clutch mechanism capable of directly transmitting torque transmitted from the damper device to the input shaft of the speed change mechanism inside a housing filled with a hydraulic fluid such as hydraulic oil.

In addition, the present embodiment described above explains a linear solenoid valve as the engagement pressure generation unit. However, not to be limited to this, the present invention can be applied to a control valve, a solenoid valve, or the like, as the engagement pressure generation unit.

The hydraulic control device for a starting device according to the present invention can be used in an automatic transmission mounted in a vehicle such as a passenger car, a truck, a bus and an agricultural machine or the like. Particularly, the hydraulic control device is suited for a hydraulic control device having a lock-up clutch capable of engagement and release due to differences in pressure between a hydraulic oil chamber and a transmission oil chamber, for example, for which a stable internal pressure of the transmission oil chamber is required.

According to an exemplary aspect of the invention, the hydraulic control device includes the internal pressure switching unit that switches between the non-reduced pressure state where the source pressure is outputted unchanged as the internal pressure to the first oil path and the reduced pressure state where the hydraulic pressure is regulated to a constant pressure from the source pressure, based on the feedback pressure of the internal pressure and the urging force of the first urging unit, and is outputted as the internal pressure to the first oil path. Hence, compared to when pressure is reduced using, for example, a relief valve, it is possible to carry out a more stable pressure reduction. Accordingly, by creating a stable reduced state of the internal pressure of the starting device, it is possible to improve controllability when engaging a lock-up clutch. Also, compared to employing a relief valve and reducing pressure by draining oil, a waste flow from an oil leak can be reduced and a volume of an oil pump can be reduced. Accordingly, as the volume of the oil pump can be reduced, torque for driving the oil pump can be reduced and a torque loss of an automatic transmission can be reduced, thereby enabling improved vehicle fuel efficiency.

According to an exemplary aspect of the invention, the source pressure of the signal pressure in the signal pressure generation unit is the line pressure and the source pressure in the internal pressure switching unit is the secondary pressure. Hence, a larger line pressure than the secondary pressure that is the source pressure of the internal pressure switching unit can cause locking. Therefore, it is possible to reliably perform a switch operation of the internal pressure switching unit.

According to an exemplary aspect of the invention, the internal pressure switching unit is a modulator valve including the first spool, the first urging unit, the first oil chamber and the second oil chamber. The signal pressure generation unit is a switch valve including the second spool, the second urging unit and the third oil chamber. Hence, compared to a structure that includes a single long valve and a relief valve that switches a channel to enable a passage of a circuit with a relief valve and reduces the secondary pressure before outputting it, two short valves enable a structure capable of switching to a reduced pressure state. It is also possible for a valve body as a whole to become more compact.

According to an exemplary aspect of the invention, it is possible to improve fuel efficiency a compactness of a torque converter with a lock-up clutch.

What is claimed is:

1. A hydraulic control device for a starting device, the hydraulic control device comprising:
a first oil path that inputs an internal pressure to the starting device that includes a clutch;
a second oil path that discharges the internal pressure;
a third oil path that inputs an engagement pressure of the clutch;
an engagement pressure generation unit that outputs the engagement pressure of the clutch to the third oil path;
a signal pressure generation unit that outputs a signal pressure when the engagement pressure is not inputted, and outputs no signal pressure when the engagement pressure is inputted; and
an internal pressure switching unit that switches between:
a non-reduced pressure state where locking occurs due to the signal pressure inputted and a source pressure is outputted unchanged as internal pressure to the first oil path, and
a reduced pressure state where the signal pressure is not inputted and a hydraulic pressure is regulated to a constant pressure from the source pressure, based on a feedback pressure of the internal pressure and an urging force of a first urging unit, and outputted as the internal pressure to the first oil path.

2. The hydraulic control device for the starting device according to claim 1, further comprising:
an oil pump that generates the hydraulic pressure based on a throttle opening;
a line pressure generation unit that generates a line pressure by the hydraulic pressure of the oil pump; and
a secondary pressure generation unit that generates a secondary pressure from a pressure discharged by the line pressure generation unit, wherein:
a source pressure of the signal pressure in the signal pressure generation unit is the line pressure; and
the source pressure in the internal pressure switching unit is the secondary pressure.

3. The hydraulic control device for the starting device according to claim 2, wherein:
the internal pressure switching unit is a modulator valve comprising a first spool, the first urging unit that urges the first spool in one direction, a first oil chamber that makes the internal pressure act on the first spool against an urging force of the first urging unit, and a second oil chamber that makes the signal pressure act on the first spool in a same direction as a direction in which the first urging unit acts;
the signal pressure generation unit is a switch valve comprising a second spool, a second urging unit that urges the second spool in one direction, and a third oil chamber that makes the engagement pressure of the engagement pressure generation unit act on the second spool against an urging force of the second urging unit;
the switch valve switches between a signal pressure non-output position of the second spool where, when the engagement pressure is inputted into the third oil chamber, the line pressure against the urging force of the second urging unit is shut off and the signal pressure is not outputted, and a signal pressure output position of the second spool where, when the engagement pressure is not inputted, the line pressure is outputted as the signal pressure by the urging force of the second urging unit; and
the modulator valve switches between a non-reduced pressure position where the first spool is in the non-reduced pressure state where, when the signal pressure is inputted into the second oil chamber, locking occurs due to the signal pressure and the secondary pressure is outputted to the first oil chamber as the internal pressure, and a reduced pressure position where the first spool is in the reduced pressure state where, when the signal pressure is not inputted, a hydraulic pressure regulated from the secondary pressure based on the internal pressure of the first oil chamber and the urging force of the first urging unit is outputted as the internal pressure to the first oil path.

4. The hydraulic control device for the starting device according to the claim 3, wherein:
the starting device includes a torque converter that carries out a hydraulic transmission using oil supplied by the internal pressure; and
the clutch includes a lock-up clutch.

* * * * *